United States Patent [19]

Lathrop

[11] Patent Number: 4,758,687
[45] Date of Patent: Jul. 19, 1988

[54] OBLIQUELY WALLED ELECTRICAL BOX

[76] Inventor: Deborah Ann Lathrop, 191 Hamilton St., Cambridge, Mass. 02139

[21] Appl. No.: 863,852

[22] Filed: May 16, 1986

[51] Int. Cl.$^4$ .............................................. H02G 3/08
[52] U.S. Cl. ........................................ 174/53; 174/67
[58] Field of Search .............. 174/53, 66, 67; 339/36, 339/37, 39; 220/3.2, 3.3, 3.92, 3.94; 439/135, 136

[56] References Cited

U.S. PATENT DOCUMENTS

| | | | |
|---|---|---|---|
| 2,089,665 | 8/1937 | Roberts et al. | 174/66 X |
| 2,752,217 | 6/1956 | Simon | 174/58 X |
| 2,917,199 | 12/1959 | Appleton | 220/3.92 X |
| 3,334,770 | 8/1967 | Stanback | 174/67 X |
| 3,690,501 | 9/1972 | Ware | 220/3.94 |
| 4,059,327 | 11/1977 | Vann | 174/66 X |
| 4,558,172 | 12/1985 | Zetena | 174/66 |
| 4,613,728 | 9/1986 | Lathrop | 174/53 |

FOREIGN PATENT DOCUMENTS 939117 10/1963 United Kingdom .................. 174/67

*Primary Examiner*—A. T. Grimley
*Assistant Examiner*—David A. Tone
*Attorney, Agent, or Firm*—Donald N. Halgren

[57] ABSTRACT

The present invention comprises an electrical enclosure apparatus having a left side wall, a right side wall, upper and lower walls and a rear panel. At least one of said walls is disposed obliquely with respect to said panel. An electrical device such as a switch or an electrical outlet is disposed through the oblique wall(s). The switch or outlet may have its own housing attached to the oblique wall, or it may be enclosed in part of the housing that comprises the oblique wall itself. The enclosure apparatus may be installed in a building under construction, and the electrical devices wired into the enclosure apparatus by the electrician, in only one visit, and before the finished wall has no effect on the electrical assembly contrary to what it does on regular electrical units.

11 Claims, 1 Drawing Sheet

OBLIQUELY WALLED ELECTRICAL BOX

BACKGROUND OF THE INVENTION (1) Field of the Invention

This invention relates to electric boxes and more particularly to enclosures for recessing electrical outlet boxes.

(2) Prior Art

Standard electrical outlet boxes may present problems when plugs are mated with them. The plugs may get in the way of furniture or be a dangerous attraction to small children. The prior art has made a number of attempts to provide various electrical unit boxes with various characteristics.

U.S. Pat. No. 2,987,909 shows an electrical outlet box which has a locking cover assembly. No arrangement is shown for egress of a power cord, nor is there shown any means for storage of such a cord. U.S. Pat. No. 3,930,116 shows an outlet face plate having brackets which holds an electrical cord. It does not however, hide the cord, nor is the outlet box enclosable.

U.S. Pat. No. 4,059,327 does disclose a recessed electrical outlet, but it is not enclosable, nor does it have cord storage facilities. This box also has oblique walls, but that is for convenience of design, not for a functional securement of an electrical receptacle to the outer walls of the enclosure box.

U.S. Pat. No. 3,652,781 shows an outlet box for outdoor use. An outlet socket is angularly supported to prevent rain or snow from getting in it. The outlet socket is itself enclosed with another rectangular housing. By enclosing the outlet socket within another rectangular housing, the advantages of the present invention are unrecognized.

It is an object of the present invention, to overcome the disadvantages of the prior art.

It is a further object of the present invention to provide an electrical outlet containment which requires the electrician who installs the present invention to be at the installation only once. That is, when the enclosure box with the outlet receptacle therein, which is all wired in once the enclosure box is attached to a wall stud. The prior art requires an electrician to make a first installation of the enclosure box to the stud and then to connect the wiring to the outlet receptacle switch, (as the case may be) in a subsequent visit after the wall is placed therearound, and the proper electrical receptacle (switch) is placed in the enclosure box to receive the wires which were left curled up inside.

It is an object of the present invention to minimize the labor involved in wiring up an electrical outlet (switch) by minimizing the visits required by an electrician, to one-half of what they would be normally.

It is yet a further object of the present invention to provide an electric enclosure box whose walls are arranged to permit easier access by an electrician's tools. That is, the walls which support the electrical device are angled to facilitate access thereto, which is not shown in the prior art.

BRIEF SUMMARY OF THE INVENTION

The present invention comprises an electrical outlet (or switch) enclosure box where one or more of the walls of the enclosure box is arranged at an oblique angle with respect to the wall on which it will be arranged.

An electrician or electrical technician will properly attach the enclosure box at its correct location on a stud of a wall. The usual wire will be brought to the enclosure box and attached to the electrical outlet and/or switch assembly (electrical device) at that time. Since the outlet/switch (electrical device) is secured through a wall either within its own housing or assembled into a unitary extension of the enclosure box itself, and is not dependent upon the wall being finished to connect the wires to the electrical device, the technician does not need to come back once the wall is attached to the studs, so that he can then wire the outlet/switch and put on the cover plate within the enclosure box.

The wall may be installed with the opening of the enclosure box exposed therethrough. A simple frame for providing a finished appearance may be snapped or screwed in place about the wall opening, since the enclosure box is already wired up. The frame may include a door which may be lockable to keep the electrical outlet/switch away from children.

The oblique nature of the walls also facilitates assembly by the technician for the one visit that he makes for each installation.

The enclosure box may be made of sheet material, or it may be made in a plastic molding process, preferably with the outlet/switch housing molded unitarily therewith, so that all the technician need install, is the wires through the housing and screw the outlet/switch to the housing and then attach the cover plate(s) within the enclosure box.

To facilitate attachment of the enclosure box to its support, i.e. the stud of a wall, one of the walls may be oblique for only a portion of its breadth. This would permit fastening means to be disposed contiguous to the wall, for ease of installation.

The enclosure box may have a cord securement means on one of the walls, preferably the back wall. Any door covering the opening of the enclosure box may have a small insulated opening therein to permit the disposition of electrical cord(s) therethrough, for empowerment of an electrical appliance.

The oblique (slanted) walls of the enclosure box may be disposed at any angle of about 110° to about 150° with respect to the wall which will be disposed against it. The preferable angle is about 35° with respect to the back wall. The preferable wall for the oblique disposition would be one of the left or right side walls, since the enclosure box would most likely be attached to a support stud along the normal side wall of the enclosure box. If more than one oblique wall for securement of an additional electrical outlet is necessary, the preferred second wall would be the upper (top) wall. A lower wall could be disposed obliquely as well if a third or alternate wall were necessary, for utilization as a support for an outlet/switch assembly.

The enclosure box is then, a five sided structure, having an opening comprising its sixth side. One of the sides, or walls, may be used for attachment to a stud or post in a wall of a building. One or more of remaining side walls of the enclosure box is disposed obliquely or at an angle of other than 90° with respect to the rear wall and to the wallboard or plasterwall to which it will be adjacent. The rear wall of the enclosure box may lie in a plane parallel to the plane of the wallboard or plasterwall which will be adjacent the opening of the enclosure box.

The rear wall may have securement means for wrapping in a compact manner, any electrical extension or appliance cord therearound. The rear wall is not a preferrable location for a switch or electrical outlet therethrough, because the depth or thickness of the walls in most buildings in which the enclosure box is to be emplaced, will not permit it.

This enclosure box may be adapted so as to be retrofitted with respect to standard electric socket (outlet) arrangements, once existing standard electric outlet box units have been removed, the wall cavity enlarged somewhat, and the unit attached to/through one or more of the oblique side walls of the present invention. The oblique enclosure box would then be securable through known means into the space where the standard electric outlet box was originally located. The enclosure would then present a unit which would be out of the way, coverable and lockable if necessary.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENTS

Figure 1:
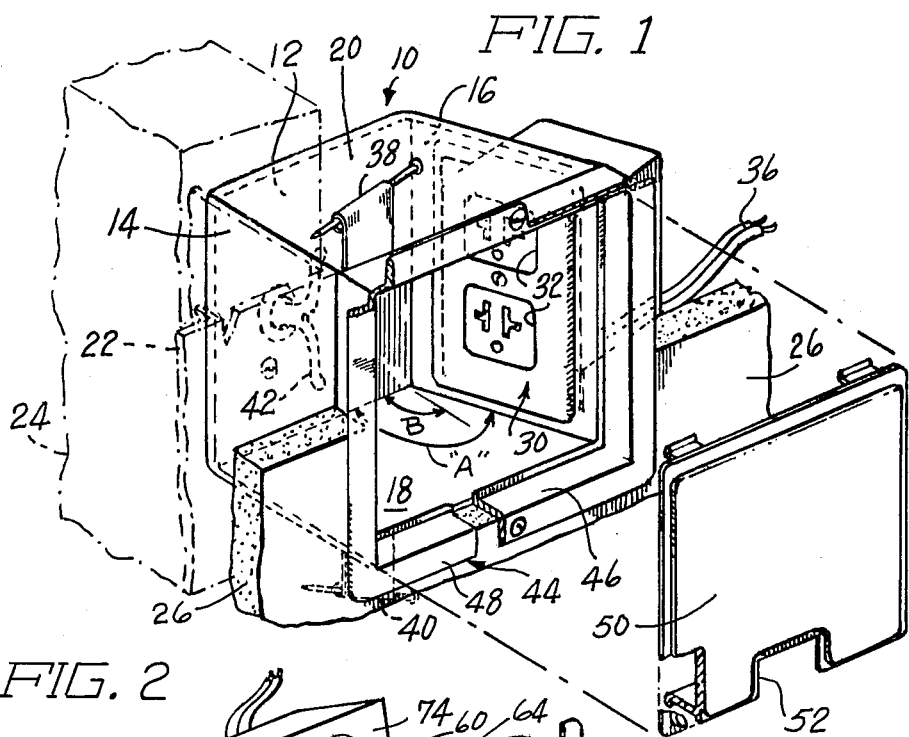
FIG. 1 is an exploded perspective view of one embodiment of an obliquely walled electrical enclosure box constructed according to the principles of this invention.

Referring now to the drawings in detail, and particularly to FIG. 1, there is shown an enclosure box 10, which is of the nature shown in my copending patent application Ser. No. 714,461, now U.S. Pat. No. 4,613,728, incorporated herein by reference.

The enclosure box 10 comprises a structure, preferably formed from sheet material such as metal, or plastic which may be injection molded in a single unit, or constructed from several pieces.

The enclosure box 10 shown in FIG. 1, has a rear wall (or panel) 12, a left side wall 14, a right side wall 16, a lower wall 18 and an upper or top wall 20. One of the side walls, 14 or 16, the left wall 14, as shown in FIG. 1, may have an "L"-shaped bracket 22 secured thereon shown in phantom lines, which might be useful to facilitate attachment of the enclosure box to a wall stud 24.

An outer finished wall 26 of plaster or wallboard would be attached to the front face of the stud(s) 24 to comprise the wall surface of a room in a building in which the enclosure box 10 is utilized.

One of the side or bottom walls 16, 18 or 20, the right side wall 16, as shown in FIG. 1, is disposed at an oblique angle "A" with the rear wall 12. The rear wall 12 is generally parallel to the finished wall 26, once it is attached to the stud(s) 24. The finished wall 26 would normally be put in place after the enclosure box 10 was attached to a stud and wired-up, unless the enclosure box was to be retrofitted into an existing wall.

Since the right side wall 16 of the enclosure box 10 is disposed at an oblique angle A with respect to the rear wall 12, it is also disposed obliquely with respect to the finished wall 26. An electrical outlet or device 30 is disposed against the right oblique wall 16. A pair of receptacle openings 32 are shown in a front panel or face plate 34 covering the electrical outlet 30. The wall structure of the electrical outlet or device 30 may be molded as a unitary part of the enclosure box 10, so as to enclose the electrical device 30 therewith, or the electrical device 30 may have its own housing which itself may be attached through an opening in the oblique wall 16 by known means. An electric wire 36 is shown attached to the electrical outlet 30, for supplying the electricity thereto.

Further attachment means 38 and 40 are disposed from the upper and lower walls 20 and 18, respectively. The attachment means comprise a tab through which a nail is slidably disposed.

A wire support 42 is shown disposed on the inside of the rear wall 12. The wire support 12 may be utilized to receive superfluous electrical cord extending to or from an appliance, not shown.

A frame 44 may be disposed about the opening of the enclosure box 10, as shown in FIG. 1. The frame 44 has an inner lip 46 which extends over the rough opening through the wall 26 to overlap or abut against the inner peripheral edges of the walls 14, 16, 18 and 20. The frame 44 has an outer lip 48 which extends about the outer periphery of the rough opening in the wall 26. The frame 44 may be inserted by a non-skilled worker after the wall 26 has been established.

A front panel 50 or door may be movably disposed into the opening across the front of the enclosure box 10. The panel 50 may be locked and slidably disposed, as was shown in my aforementioned application. The panel 50 might have an access port 52 for the egress of any electrical cord within the enclosure box 10.

Figure 2:
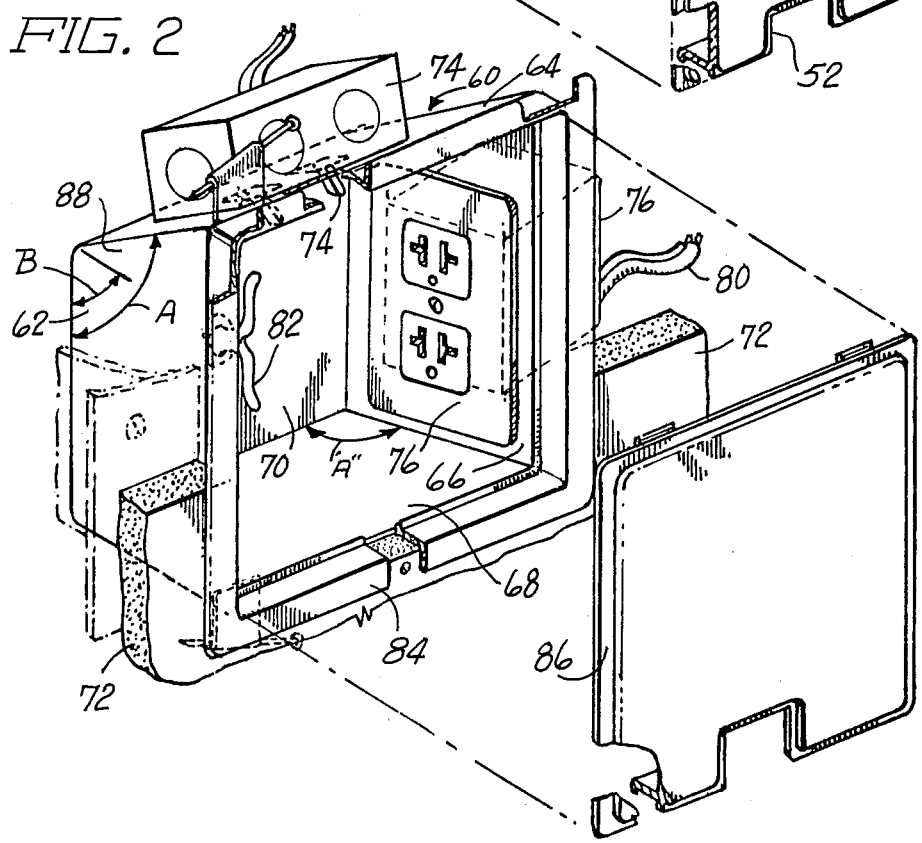
FIG. 2 is an exploded perspective view of a further embodiment of the outlet enclosure box shown in FIG. 1.

A further embodiment of my invention shown in FIG. 2, discloses an enclosure box 60 having a left side wall 62, an upper wall 64, a right side wall 66, a lower wall 68 and a rear wall 70. In this embodiment, at least two of the walls are oblique to the rear wall 70. The oblique walls are the upper wall 64 and the right side wall 66. A finished wall 72 is shown disposed about the enclosure box 60.

The upper wall 64 is disposed obliquely to the finished wall 72 as is the right side wall 66. An electrical switch 74 is shown in FIG. 2, secured to the upper wall 64, and an electrical outlet 76 is shown attached to the oblique right side wall 66. Each switch and outlet 74 and 76 may have an electric wire 80 servicing it, as well as appropriate face plates.

A wire support 82 may be secured to the inside of the rear wall 70, as disclosed in the earlier embodiment. A frame 84 may be emplaced about the rough opening of the wall 72, as described above, and a front panel 86 may be movably disposed across the opening of the enclosure box 60, as was shown in the aforementioned embodiment.

The angle A of obliqueness of the walls 16, 64 and 55 to their respective rear walls 12 and 70 as well as to their respective finished walls 26 and 72, may lie in a range of from about 110° to about 150°, the preferred angle about 135°.

An angle B, shown in both FIGS. 1 and 2, is 90°. It is to be noted, that a wall, such as upper wall 64, need not be oblique for its entire breadth, but may have a shoulder 88, as shown in dashed lines in FIG. 2. This shoulder 88 may facilitate attachment means, or the like.

The oblique wall(s) of the enclosure box 10 or 60 defines the planar surface of the front of any electric device thereattached. In a fully unitary injection molded enclosure box, the housing of the electric device(s) are part of the same mold as the enclosure box. Otherwise, the housing(s) of the electrical device(s) are merely secured thereto through openings in the oblique walls, by known means. The obliqueness of any wall may be arranged so as to extend over only a portion of that wall, the remaining portion of the wall being non-oblique or otherwise discontinuous with respect to the oblique portion. This might facilitate attachment of the enclosure box 10 or 60 to a wall stud.

I claim:

1. An enclosure apparatus adaptable for use in a building wall, to supportively house at least one electrical device, comprising:
    a first and a second side wall attached to an upper and a lower wall having a rear panel there attached comprising an enclosure box;
    at least one portion of each of at least two adjacent walls being obliquely disposed with respect to said rear panel; and
    means for receiving an electrical device in at least one of said oblique walls.

2. An enclosure apparatus as recited in claim 1, wherein said oblique wall is disposed at an angle of greater than 90° with respect to said rear panel.

3. An enclosure apparatus as recited in claim 2 wherein the angle between said oblique wall an said rear panel is within a range from about 110° to about 150°.

4. An enclosure apparatus as recited in claim 1, wherein a wire support is disposed onto one of said walls or panel to permit storage of electrical cord thereon.

5. An enclosure apparatus as recited in claim 1, including a frame disposed about the periphery of said walls.

6. An enclosure apparatus as recited in claim 5, wherein a front panel is movably disposed in said frame.

7. An enclosure apparatus as recited in claim 1, including a separate housing for an electrical device, attachable to at least one of said oblique walls.

8. An enclosure apparatus as recited in claim 1, including a unitary housing for an electrical device, common with said enclosure apparatus.

9. A method of making an enclosure apparatus for use in a building to supportively house at least one electrical device, comprising the steps of:
    providing an enclosure box having a left and a right side wall, a top and a bottom wall, and a rear panel attached to said walls;
    arranging at least two adjacent walls at an oblique angle with respect to said rear panel; and
    disposing an electrical device through at least one oblique wall of said enclosure box.

10. A method of making an enclosure apparatus as recited in claim 9, therein said oblique wall is arranged at an angle of about 110° to about 150° with respect to said rear panel.

11. A method of making an enclosure apparatus as recited in claim 10, including:
    movably supporting a front panel on said enclosure apparatus to enclosed said electrical device therein.

* * * * *